Figure 3:
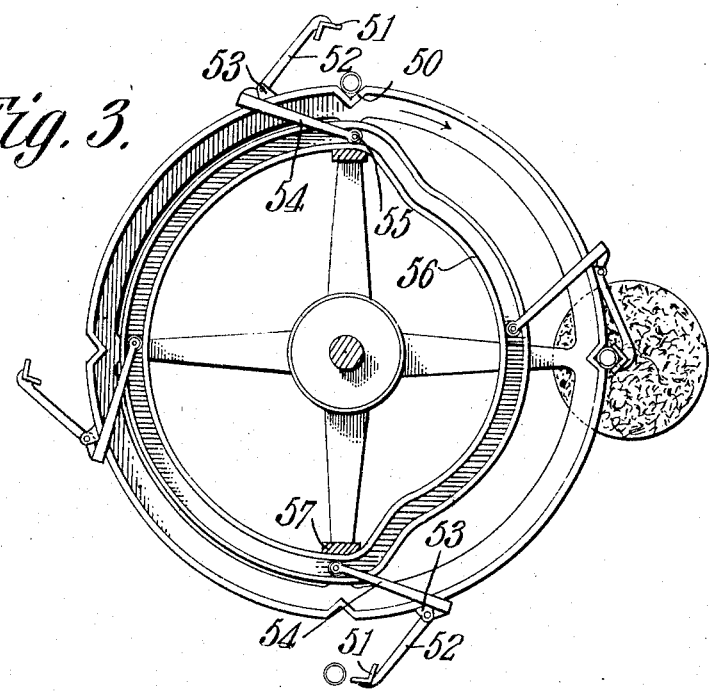

No. 878,685. PATENTED FEB. 11, 1908.
C. O. STRUTZ.
PIPE TOPPING MACHINE.
APPLICATION FILED OCT. 23, 1907.
2 SHEETS—SHEET 1.
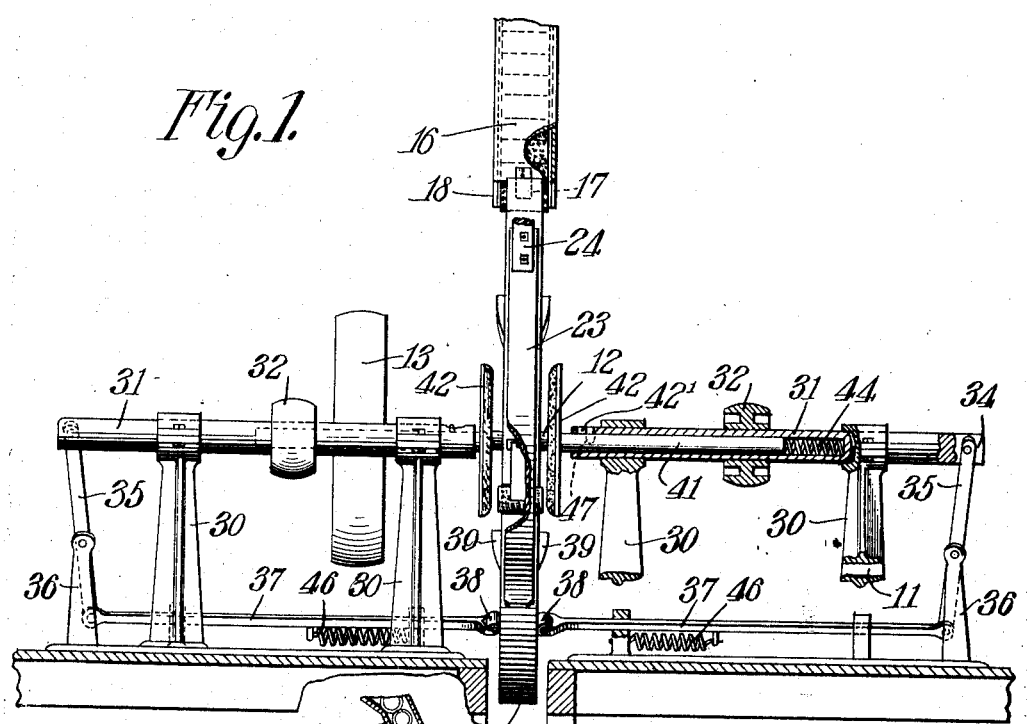
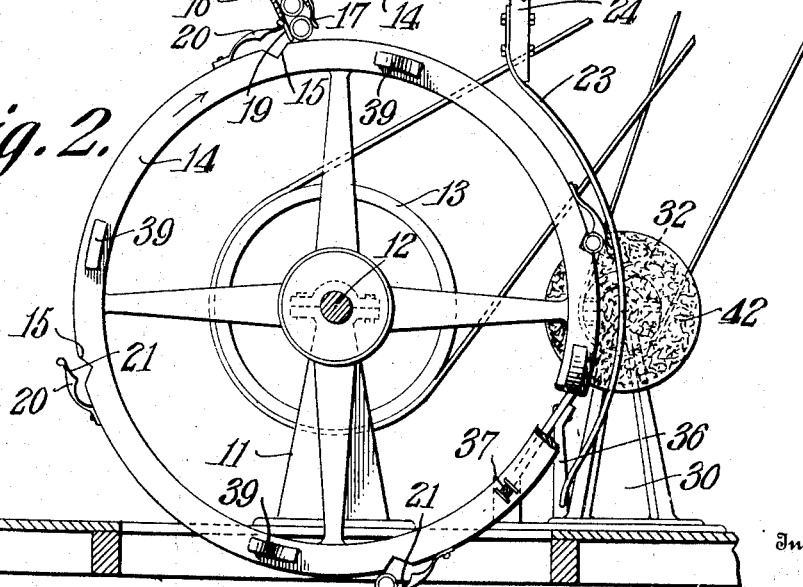
Witnesses
Inventor
Charles O. Strutz.
By C. A. Snow & Co.
Attorneys No. 878,685.  
PATENTED FEB. 11, 1908.  
C. O. STRUTZ.  
PIPE TOPPING MACHINE.  
APPLICATION FILED OCT. 23, 1907.

2 SHEETS—SHEET 2.

Witnesses  
Inventor  
Charles O. Strutz.  
By  
Attorneys

UNITED STATES PATENT OFFICE.

CHARLES OSCAR STRUTZ, OF WASHINGTON, MISSOURI.

PIPE-TOPPING MACHINE.

No. 878,685.   Specification of Letters Patent.   Patented Feb. 11, 1908.

Application filed October 23, 1907. Serial No. 398,848.

*To all whom it may concern:*

Be it known that I, CHARLES OSCAR STRUTZ, a citizen of the United States, residing at Washington, in the county of Franklin and State of Missouri, have invented a new and useful Pipe-Topping Machine, of which the following is a specification.

In the manufacture of corn cob pipes, the cobs are first sawed into lengths, then bored to form the tobacco well, and then turned into shape. After this the pipe blanks are tumbled to remove particles of material still clinging to the surface of the pipe, and are filled by placing the pipe in a solution of plaster of paris, which enters the pores. The pipes are then dried and after the drying operation are scoured, shellacked, and then slickened, prior to the so called operation of topping, which smooths the top and bottom surfaces of the pipes, after which the pipes receive the stem holes and are labeled and given the final two coats of shellac.

The operation of topping or smoothing the surfaces of the tops and bottoms of the pipes has heretofore been carried on exclusively by hand in the manufacture of corn cob pipes, it being found impossible owing to the lack of uniformity in the length and diameter of the pipes to employ machines for that purpose. The usual topping operation was accomplished by the operator holding first the top and then the bottom of the pipe in contact with a rapidly revolving abrading surface, usually in the form of a disk covered with sand-paper or like material.

The principal object of the present invention is to provide a machine for accomplishing the topping operation, such machine being capable of handling pipes of any length and any diameter.

A further object of the invention is to provide a machine of this type in which the pipes are fed from a suitable magazine or reservoir and carried between a pair of abrading surfaces to accomplish the topping operation, after which the pipes are automatically discharged to a suitable receptacle in readiness for the subsequent operations.

A still further object of the invention is to provide a machine in which the abrading surfaces will automatically adjust themselves to receive pipes of different length, and in which the topping operation may be accomplished under practically the same degree of pressure, no matter what the length of the pipe may be.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 4:
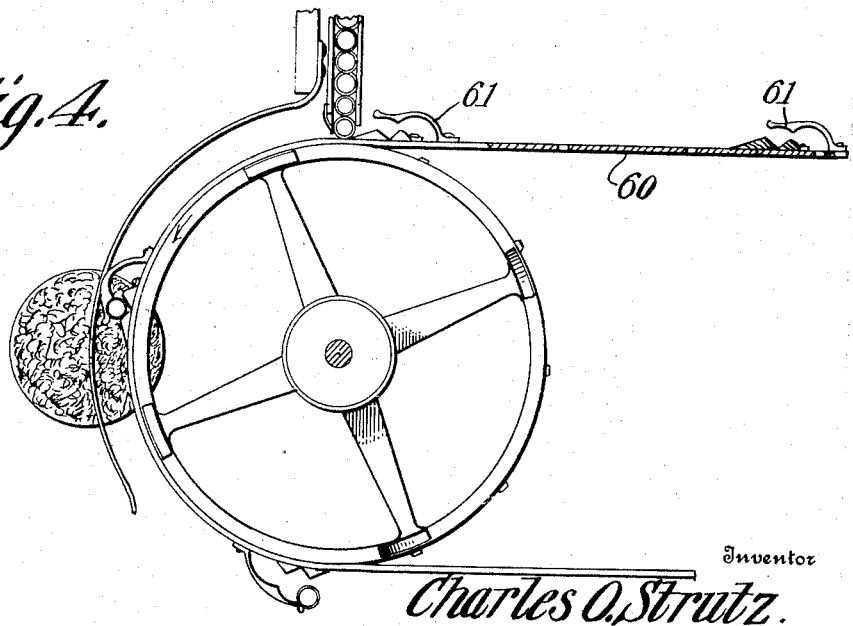

In the accompanying drawings:—Figure 1 is a longitudinal sectional view of a pipe topping machine constructed in accordance with the invention. Fig. 2 is an end elevation of the machine, partly in section, and parts being broken away in order to more clearly illustrate the construction. Fig. 3 is a transverse sectional view illustrating a slight modification. Fig. 4 is a similar view illustrating a construction in which an endless carrier is used in place of the revoluble carrier.

Similar numerals of reference are employed to indicate corresponding parts throughout the several figures of the drawings.

The working parts of the machine are supported on a suitable base of any desired construction, and said base is provided with standards 11 for the reception of a horizontally disposed shaft 12 on which is a belt wheel 13 driven from any suitable source of power.

Mounted on the shaft 12 is a pipe feeding disk 14, that is provided with a plurality of equidistantly spaced peripheral notches 15, which are arranged to receive the pipes from a reservoir or chute 16. The reservoir or chute extends in a direction practically radially from the axis of the shaft 12, and at the lower portion is of a width sufficient to receive only a single pipe. The bottom of the reservoir proper terminates at a distance from the periphery of the disk 14 greater than the diameter of the largest pipe to be operated upon, and at the discharge side of the reservoir are spring fingers 17 which will prevent accidental discharge of the lowermost pipe. At the opposite side of the reservoir is a plate 18 that extends down close to the periphery of the disk 14 and is provided with a vertical slot 19 for the passage of a pipe engaging finger 20. This pipe engaging finger 20 is arcuate in form, and its inner end is in the form of a leaf spring that is permanently secured in a slot formed in the periphery of the disk. The outer or free end of the finger has a slightly rounded head in order that it may engage between the lowermost and the second pipes of the reservoir, without injuring either pipe, and the finger yields in one direction or the other as may be dictated by the diameter of the lowermost pipe. On the lower side of this finger is a small cam 21, which serves to direct the pipe into the notch or groove 15 of the disk, so that during the rotation of the disk the successively lowermost pipes will be engaged by the finger and removed from the reservoir, the spring 17 yielding as the pipes are discharged.

The pipes are arranged to travel around rather more than half the circumference of the disk, and in order to prevent their falling out during the topping operation, a holding spring 23 is employed, this spring being in the form of a narrow strip of metal secured at its upper end to a carrying bar 24 and curved to conform to the contour of the disk. As the fingers 19 engage the spring strip 23 they are pressed more firmly into engagement with the pipe and will rigidly clamp the pipe in place until the finger passes beyond the end of the spring. At this point the weight of the pipe will be imposed on the spring finger, and the latter will yield in order to allow the pipe to fall by gravity from the disk. At each side of the feeding disk is arranged a pair of standards 30, said standards carrying bearings for a shaft 31 that is bored out for the greater portion of its length and is free for both longitudinal and rotative movement in the bearings. This shaft carries a pulley 32 that may be driven by a belt from any suitable source of power, and at one end of the shaft is an annular groove 34 for the reception of the bifurcated upper end of a lever 35 that is pivoted to a standard or bracket 36 on the base. The lower end of the lever 35 is engaged by a rod 37. The inner end of said rod is provided with an anti-friction roller 38 that is arranged to be engaged by a cam 39 projecting from the opposite sides of the feeding disk, there being as many cams on the disk as there are pipe feeding fingers.

Mounted on the hollow shaft 31 is a second shaft 41, there being a feathered connection between the two in order to insure rotative movement of said shaft 41. At the inner end of the shaft 41 is a disk 42 and one face of the face adjacent the feeding wheel or disk is covered with abrasive material, such as sand-paper. The edge of the disk is flared outward in order to facilitate the entrance and discharge of the pipes and the disk is pressed forward to working position by means of a spring 44 that is arranged in the bore of the hollow shaft 41.

In the operation of the machine, the pipes are fed from the reservoir by the fingers 19, and as the pipe approaches the abrading disks 42 said disks are spread apart by springs 46 which engage the rods 37 and pull the inner ends of the rods toward each other. In order to prevent the abrading disks moving toward each other to such an extent as to prevent the entrance of the pipe, a limiting pin 47 carried by the outer shaft 31 engages the end of a groove 42' formed in the inner shaft 41. The pipe having entered between the disks, one set of cams 39 engage with the anti-friction rollers 38 at the inner ends of the rods 37 and force the same outward. This movement is transferred to the shafts 31 and the latter are forced toward each other compelling the abrading disks to move into engagement with the ends of the pipe. As the abrading disks are revolved at high speed, they will finish the ends of the pipe, and if the pipe is a long one, the springs 44 will yield to a greater extent than if the pipe is of lesser length, the extent of movement being such that the additional compression force exerted by the spring will not make any material difference in the pressure exerted on the pipe. The topping operation is completed before the pipes pass beyond the peripheral line of the abrading disks and when the operation is completed, the cams 39 pass from engagement with the anti-friction rollers 38, so that the springs 46 are free to move the rods 37 inward and thus separate the abrading disks, so that the pipe is free to move toward the discharge position. When the pipe carrying finger reaches the end of the spring 23, the weight of the pipe will move the finger outward, so that the pipe may fall by gravity.

The construction of the pipe clamps may be altered in the manner shown in Fig. 3, wherein the periphery of the disk is provided with a stationary jaw 50 in which the pipe blank is placed, and the outer portion of the pipe is then engaged by a movable jaw 51 carried by a lever 52 that is pivoted on a small bracket 53 projecting from the disk. The opposite end of the lever 52 is connected by an arm 54 to a pin or anti-friction roller 55 that traverses a cam groove 56 formed in a stationary disk 57, the groove being so shaped as to positively open and close the clamping jaw for the purpose of holding the pipe during the topping operation and releasing the same after the topping operation is completed. It is obvious that in place of a revoluble carrier, an endless chain 60 may be employed, the chain being provided with pipe carrying clamps 61 in order to carry the pipes between the abrading disks.

With a device constructed in accordance with this invention, the topping operation may be completed much more quickly than is possible by hand, and at the same time the pipe is so finished that the top and bottom are certain to be in parallel relation.

I claim:—

1. In combination, an endless pipe carrier, a pair of abrading disks, revoluble spring pressed shafts carrying the disks, hollow shafts in which the revoluble shafts are mounted, and cams projecting from the endless carrier and operatively connected to said hollow shafts to thereby separate the disks.

2. In combination, an endless pipe carrier, a pair of abrading disks, revoluble shafts carrying the same, hollow shafts in which said revoluble shafts are mounted, springs engaging said revoluble shafts and tending to move the disks toward each other, means for revolving the hollow shafts, cams on the endless carrier, rods arranged to be engaged by the cams, and means for connecting the rods to the hollow shafts.

3. In combination, an endless pipe carrier, a pair of abrading disks between which said carrier is arranged to move, revoluble shafts supporting said disks, hollow shafts receiving the revoluble shafts, and to which said revoluble shafts are feathered, springs tending to force the revoluble shafts toward each other, means for limiting the inward movement of said shafts, and disks, a series of cams on the endless carrier, rods having anti-friction rollers arranged to be engaged by said cam, and levers connecting said rods to the hollow shafts.

4. In a machine of the class described, a revoluble disk having peripheral notches, a plurality of spring fingers carried by said disk, said fingers being movable outward under the weight of the pipes to permit the latter to discharge, a reservoir slotted at the entrance side for the passage of the fingers and provided on the discharge side with a yieldable member, and a pair of abrading disks between which said disk is arranged to travel.

In testimony that I claim the foregoing as my own, I have hereto affixed my signature in the presence of two witnesses.

CHARLES OSCAR STRUTZ.

Witnesses:
 WALTER J. STUMPE,
 F. A. RUGE.